United States Patent [19]

McIntyre

[11] 4,318,658

[45] Mar. 9, 1982

[54] TILTING DECK VEHICLE

[76] Inventor: Raeburn C. McIntyre, 175 Greenwood Village, Sherwood Park, Alberta, Canada

[21] Appl. No.: 101,030

[22] Filed: Dec. 6, 1979

Related U.S. Application Data

[63] Continuation of Ser. No. 910,225, May 30, 1979, abandoned.

[51] Int. Cl.³ ............................................. B60P 1/00
[52] U.S. Cl. .................................... 414/480; 414/476; 298/17 R; 403/102
[58] Field of Search .............. 414/474, 476, 480, 482, 414/483, 485; 298/7, 17 R, 17 B, 17 SG, 19 R, 20 R, 22 R, 23 MD, 38; 180/89 A; 403/92, 93, 102; 16/190, 178; 280/785

[56] References Cited

U.S. PATENT DOCUMENTS

| | | | |
|---|---|---|---|
| 1,537,457 | 5/1925 | Bryan | 414/476 |
| 1,704,884 | 3/1929 | Cullinan | 298/17 R |
| 2,466,791 | 4/1949 | Cook | 298/17 R |
| 2,749,175 | 6/1956 | King et al. | 298/22 R |
| 3,066,816 | 12/1962 | Schwartz | 414/476 |
| 3,145,055 | 8/1964 | Carter | 298/22 R |

FOREIGN PATENT DOCUMENTS

| | | | |
|---|---|---|---|
| 320505 | 4/1919 | Fed. Rep. of Germany | 403/102 |
| 150965 | 11/1931 | Switzerland | 403/102 |

*Primary Examiner*—Trygve M. Blix
*Assistant Examiner*—L. E. Williams
*Attorney, Agent, or Firm*—E. Peter Johnson

[57] ABSTRACT

The side rails of the chassis of a fixed bed truck are cut at the front end of the rear springs and pivotally interconnected using hinges incorporating hinge pins which are positioned below those side rails. A deck is secured to the rear section of the chassis for movement between a rearwardly inclined position and a lowered position in which it extends over the front section of the chassis. An apron is pivotally mounted on the rear end of the deck for movement between an extended ramp position and a retracted position in which it depends downwardly from the deck. Hydraulic apparatus are provided for tilting the deck, extending the apron and latching the deck in its lowered position. The hinges and the latching systems are constructed so that the truck can still be driven safely even after structural failure of both hinge pins.

7 Claims, 13 Drawing Figures

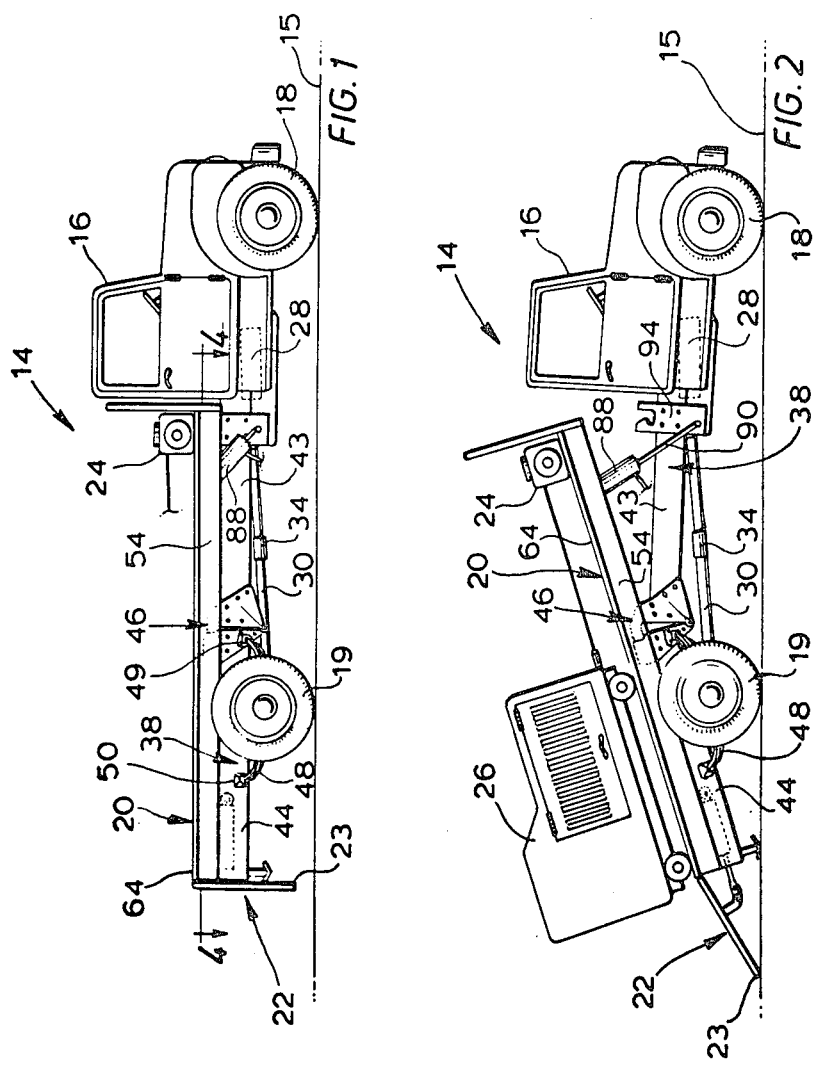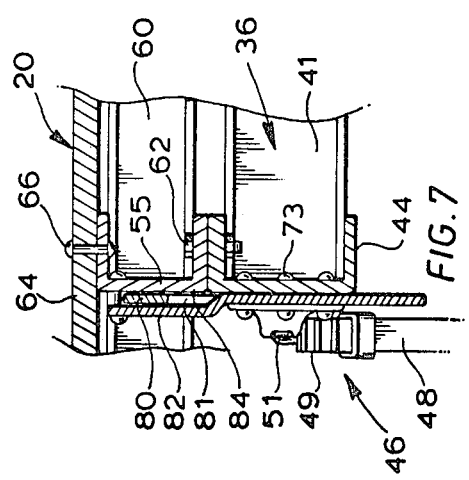

TILTING DECK VEHICLE

This is a continuation of application Ser. No. 910,225, filed May 30, 1979, now abandoned.

BACKGROUND OF THE INVENTION

The present invention relates to tilting deck vehicles of a type which are especially suited for transporting heavy equipment such as compressors, generators, back-hoes, fork-lifts and the like, as well as for moving disabled automobiles and small trucks. A vehicle in accordance with this invention can be in the form of a trailer intended to be used with a separate tractor or it can be in the form of a truck having its own prime mover or motive power source.

The cost in this day and age of custom building a tilting deck truck or vehicle would be so high as to be totally unfeasible. For this reason such vehicles have been and still are generally manufactured by modifying existing production model fixed deck vehicles. For many years, it has been customary to effect such modification by mounting a tipping or tilting deck on top of the existing chassis or frame of such a commercially available vehicle. This known procedure presents the problem that the tilting deck is relatively high above the road surface. Consequently, it is difficult to effect the modification in such a way that the rear end of the deck can be fully lowered onto the ground surface without resorting to an excessive and unpractical tilt or loading angle. This problem can, of course, be avoided by extending the deck of the vehicle rearwardly but then difficulties arise with respect to weight distribution and stability as well as with respect to the ease with which the vehicle can be driven, a long rearward extension being a very serious problem under regular driving conditions.

In an attempt to avoid these problems at least partially, it has previously been proposed to provide the necessary pivot means, such as hinges, in the side rails of the actual chassis or frame of the existing vehicle and then to mount the tilting deck on the rearward section of the divided chassis so that such deck extends forwardly over the forward section of the chassis.

In the case of trucks, such division of the existing frame or chassis presents a further problem; when the rear section of the chassis of such a modified vehicle is moved into its inclined position, the rear axle of the vehicle moves in the forward direction. Since the combined universal-slip joint provided in the main drive transmission shaft of a conventional truck is generally adapted to accommodate only limited forward movement of the rear axle, the angle through which the rear section of such a chassis can be moved is limited unless a special slip joint is incorporated at substantial expense into the main shaft. It would, of course, also be possible to avoid this problem by rearwardly extending the deck but this would again present weight distribution problems and difficulty in driving the vehicle. It has also been proposed to avoid this problem by providing such a modified vehicle effectively with a rearwardly extendable deck so that, before moving the deck into its inclined position, controls are operated to extend that deck rearwardly. This prior solution, however, presents several serious disadvantages. In the first place, such a sliding deck is inevitably quite expensive. Secondly, it presents the problem that, unless constructed in a very rugged and consequently highly expensive manner, it will be easily damaged during use, particularly if a heavy load is hauled onto the deck in a direction angularly disposed with respect to the longitudinal forward-rearward direction.

It is a principal object of this invention to provide a vehicle, such as a trailer but especially a truck, in which the disadvantage of the known and previously proposed structures for tilting deck vehicles are avoided or at least very substantially reduced.

Another object of this invention is to provide a vehicle of the type in question and which can be constructed by modification of an existing fixed deck vehicle at relatively low cost.

Yet another object of this invention is to provide a vehicle of the aforesaid type and which vehicle has a deck which is tilted through a relatively small angle while not extending an excessive distance rearwardly from its rear wheels so avoiding the weight distribution and drivability problem of many known and previously proposed vehicles.

A further object of this invention in accordance with a preferred feature thereof is to provide a tilting deck truck which can be manufactured by modification of an existing fixed deck truck without requiring the installation of a specially made slip joint in the main drive shaft of such a truck.

One more object of this invention in accordance with another preferred feature thereof is to provide a tilting deck vehicle incorporating safety features which will significantly reduce the risk of damage to the vehicle and injury to the driver thereof in the event of failure of the pivot means provided on such a vehicle.

Yet a further object of this invention is to provide a tilting deck vehicle which is not readily damaged even when heavy loads are hauled onto the deck of such a vehicle in a direction angularly disposed with respect to the forward-rearward direction.

Other objects of the invention will become apparent as the description herein proceeds.

SUMMARY OF THE INVENTION

The invention is based on the finding that objects already indicated can be attained to varying extents by the application to the construction of a tilting deck vehicle of several features. To obtain optimum benefit, most of the features of this invention will be applied jointly in such construction but advantages are, however, still obtained when only one or some of the novel features of this invention are applied in such construction.

A vehicle in accordance with this invention is constructed by providing the necessary pivot means in the side rails of the existing frame or chassis of a vehicle so to provide relatively pivotable front and rear frame sections. A deck is then fixed on the rear section so as to extend forwardly over the front section when that deck is in a generally horizontal lowered position.

A vehicle in accordance with this invention consequently comprises a front frame section; a rear frame section; a transversely extending rear axle carrying ground-engaging rear wheels and supported by the rear frame section; pivot means pivotally interconnecting the front and rear sections for movement about a pivot axis of the rear frame section between a generally horizontal lowered first position and a rearwardly and downwardly inclined second position; and a deck fixed on the rear frame section for conjoint pivotal movement therewith and extending generally forwardly over the front frame section when the rear frame section is disposed in its generally horizontal lowered first position.

One feature of this invention concerns the location of the pivot axis about which the front and rear sections pivot. It has been found that the distance to which the deck of the vehicle must extend rearwardly beyond the rear axle for a given maximum tilting angle is reduced by locating the pivot axis as close as possible to that rear axle. In the case of a truck, such location of the pivot axis close to the rear axle also reduces the extent of forward movement of the rear axle for a given tilting angle so permitting the construction of such a truck without requiring the replacement of the existing slip means in the drive transmission shaft of the truck.

In accordance with one useful feature of this invention, the desirable close location of the pivot axis to the rear axle can be obtained by constructing the pivot means so that the pivot axis is not only disposed as rearwardly as possible but is also disposed below the rear section of the frame when that rear section is disposed in its lowered first position.

In accordance with another useful feature of this invention, a vehicle can be provided with a rearward extension or apron which is movably mounted on its deck at a rearward end thereof for movement of such apron between an extended ramp position in which a transversely extending rear edge of the apron abuts an upwardly facing ground surface on which the vehicle is disposed when the deck and the rear frame section are moved into their inclined second position so to provide a ramp then essentially coplanar with the deck, and a retracted position. Such a ramp can, for example, be mounted for movement between its extended ramp position and the retracted position in which it depends generally downwardly from the deck.

In accordance with yet another feature of this invention, improved operational safety can be obtained by constructing the pivot means in a vehicle in accordance with this invention so that it comprises a hinge pin as well as cooperating and relatively movable first and second members secured to respective ones of the front and rear frame sections and adapted to restrict relative vertical movement of those frame sections in the event of structural failure of that hinge pin. Additional operational safety can also be obtained by providing such a vehicle with a latching means for releasably retaining the deck and rear frame section of the vehicle in their lowered first position, if such a latching means is also adapted to restrict both vertical and rearward movement of the deck relative to the front frame section when the deck is latched in its lowered first position.

Other features of the invention and the various advantages obtained when the preferred features of the invention are applied separately and jointly in the construction of a vehicle will become apparent as the description herein proceeds.

BRIEF DESCRIPTION OF THE DRAWINGS

The invention will now be described merely by way of illustration with reference to the accompanying drawings in which:

FIG. 1 is a somewhat schematic side elevation of one embodiment of a tilting deck vehicle or truck in accordance with this invention and showing a deck of that truck in a generally horizontal lowered first position thereof;

FIG. 2 is a somewhat schematic side elevation similar to that of FIG. 1 but showing the deck of the truck in a rearwardly and downwardly inclined or tilted second position thereof and a portable generator being loaded onto the deck of the truck;

FIG. 7 is a sectional view when taken as indicated by the arrows 7—7 of FIG. 5;

DESCRIPTION OF THE PREFERRED EMBODIMENTS

Figure 3:
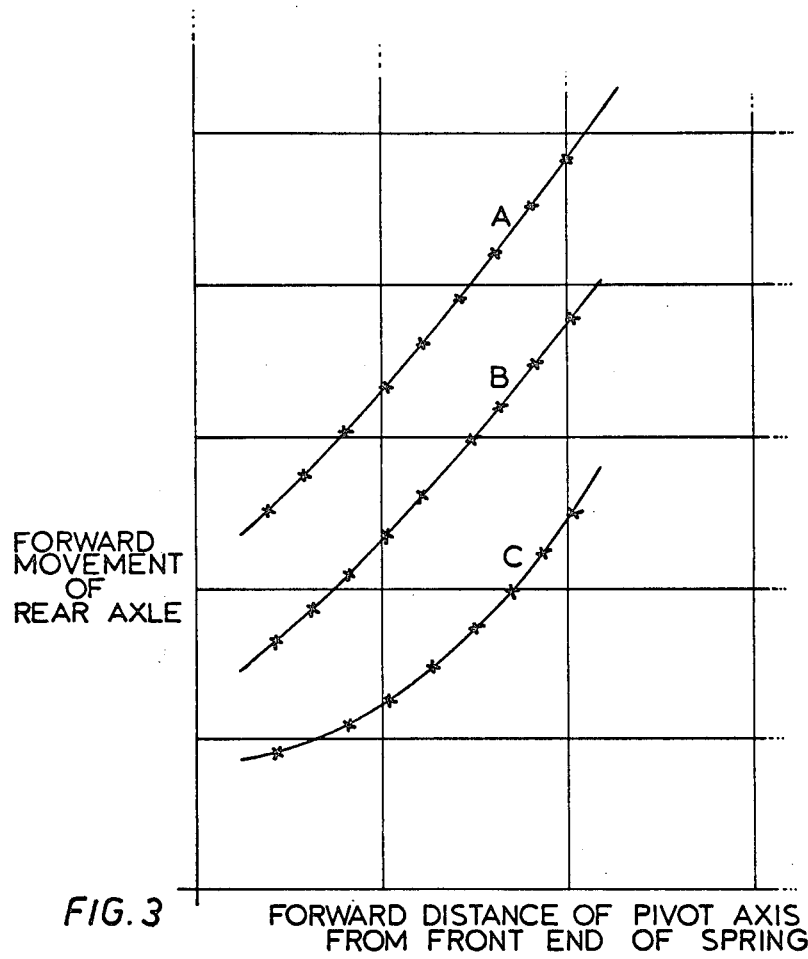
FIG. 3 is a graphical illustration showing the relationship between the position of a tilting pivot axis of a truck similar to that shown in FIGS. 1 and 2 relative to the rear axle position and the extent to which the rear axle of such a truck moves forwardly when the deck of the truck is moved from its lowered position and into its inclined second position.

Referring first to FIGS. 1 and 2, it will be noted that there is shown therein generally at 14 one embodiment of a vehicle in accordance with this invention. The vehicle 14 is shown as being a truck standing on a ground surface 15 and as having a cab 16, front and rear wheels 18 and 19 respectively and a deck generally indicated at 20. In a manner yet to be explained, the deck 20 can be moved between a generally, horizontal lowered first position as shown in FIG. 1 and a rearwardly and downwardly inclined second position as shown in FIG. 2.

Across the rear end of the deck 20, there is movably mounted an apron generally indicated at 22. When the deck 20 is in its lowered first position as shown in FIG. 1, the apron 22 is moved so as to depend downwardly from the deck 20 as actually shown in FIG. 1. When the deck 20 is to be moved into its inclined second position as shown in FIG. 2, the apron 22 is first moved into its extended position so that, when the deck 20 is elevated, the apron 22 provides a ramp essentially coplanar with the deck 20 and having its rear edge 23 engaging the ground surface 15.

The truck 14 is also shown in FIGS. 1 and 2 as being provided on the forward end of the deck 20 with a winch 24 by means of which the truck can be loaded. By way of example, a generator is shown schematically at 26 in FIG. 2 as being loaded onto the deck 20.

Figure 4:
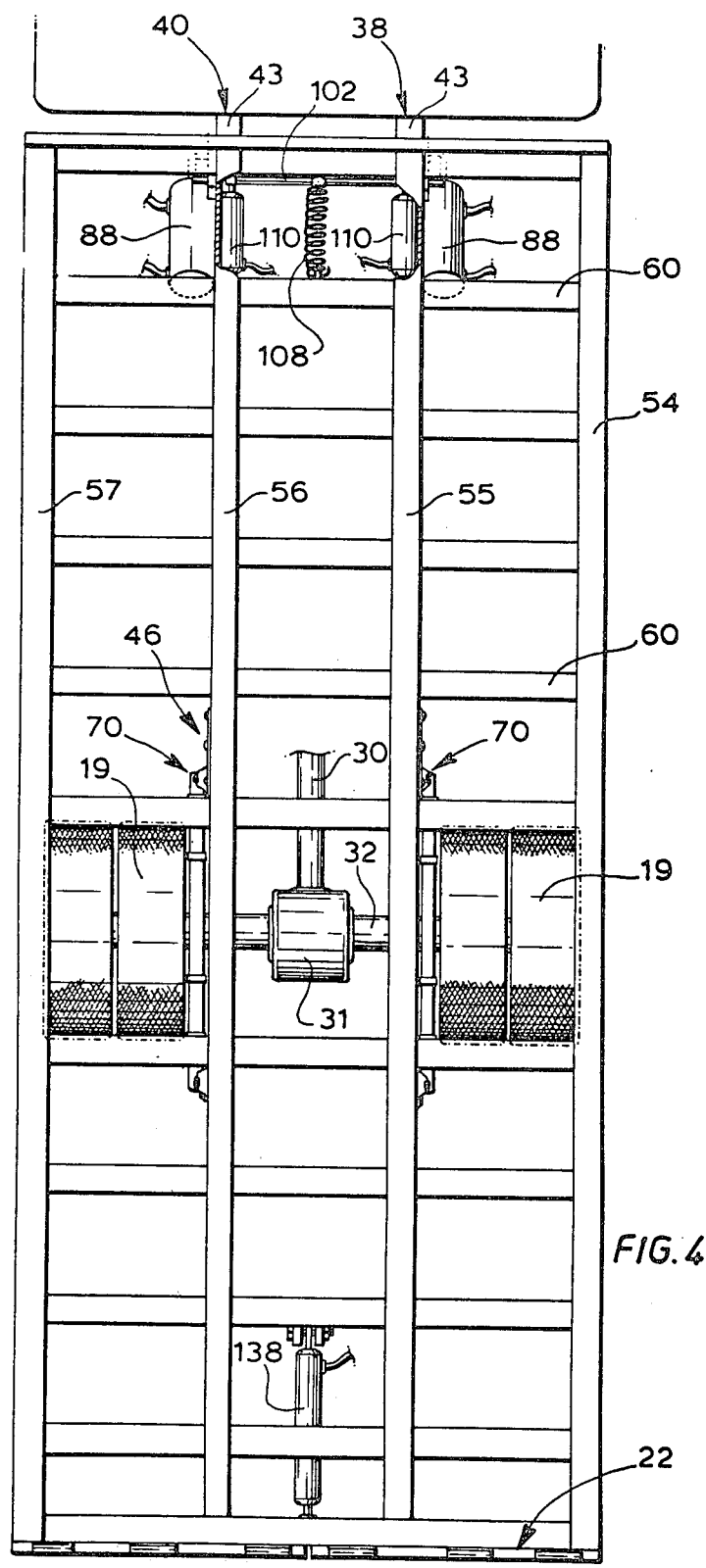
FIG. 4 is a plan view taken as indicated by the arrows 4—4 of FIG. 1 with certain parts omitted and others shown fragmentarily.
Figure 5:
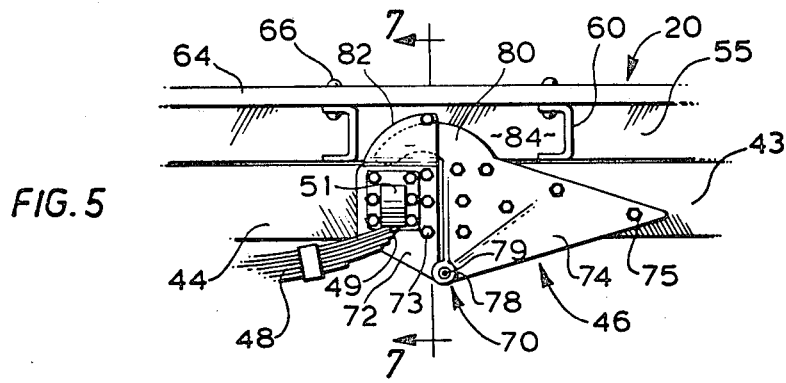
FIG. 5 is a fragmentary elevational view showing one hinge provided in the truck shown in FIGS. 1 and 2 to permit movement of the deck of that truck between the positions shown in those figures, the deck actually being shown in its lowered first position.
Figure 6:
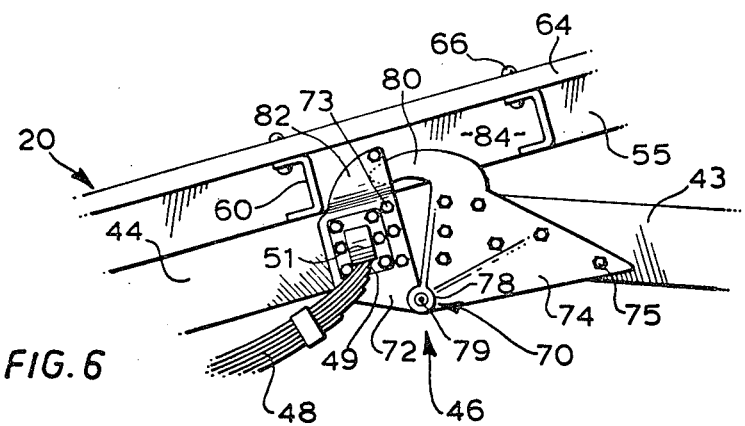
FIG. 6 is a fragmentary elevational view similar to that of FIG. 5 but showing the deck in its inclined second position.

The truck 14 comprises an engine (not illustrated) which drives a gear box shown in phantom outline at 28 and from which a main drive shaft 30 extends in a conventional manner to a differential 31 (FIG. 4) in a rear axle 32 carrying the rear wheels 19. For the sake of this description, the gear box 28 will be considered to be the motive power source from which rotational drive movement is transferred to the rear axle 32 by the drive shaft 30. The drive shaft 30 is shown as being conventionally provided with a combined universal-slip joint 34 which permits limited flexing of the shaft 30 and limited shortening of that shaft 30 on forward movement of the rear axle 32. In conventional trucks, such slip joints normally permit shortening of the shaft to a maximum extent of about 3 inches.

Figure 9:
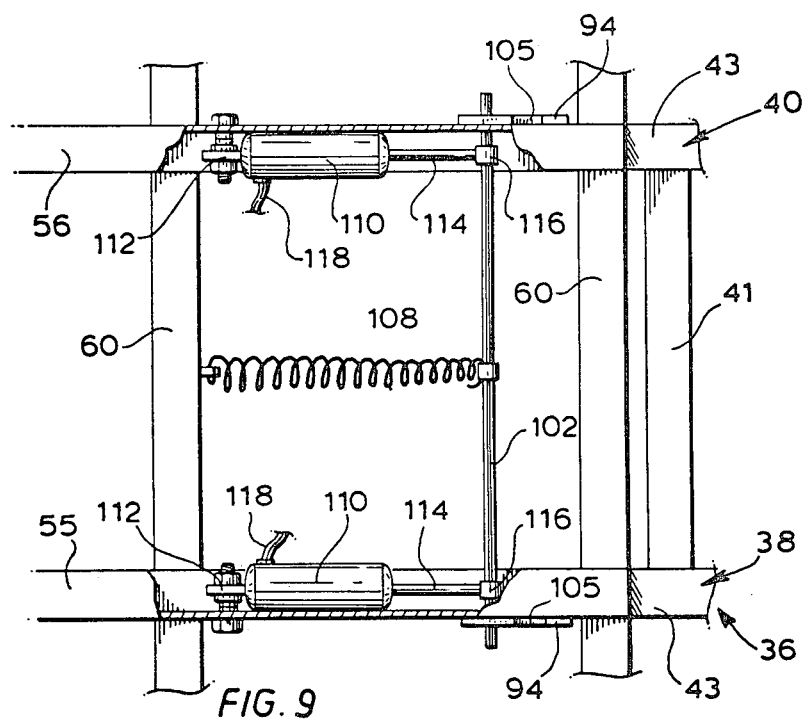
FIG. 9 is an enlarged fragmentary plan view showing further detailes of the latching mechanism provided on the truck shown in FIGS. 1 and 2.

The truck 14 has a chassis or frame generally indicated at 36 and including side beams or rails generally indicated at 38 and 40, which are connected by transversely extending cross members 41 (FIGS. 7 and 9). In a conventional unmodified fixed deck truck, the side rails 38 and 40 are, of course, continuous throughout their entire lengths. In the truck 14, those side rails have, however, been cut into front and rear sections 43 and 44 which are pivotally interconnected as generally indicated at 46 and in a manner yet to be explained to permit the described tipping or tilting movement of the deck 20. It will now be understood that to construct the truck 14 using a conventional fixed bed production model truck, it will first be necessary to cut the side rails 38 and 40 to permit the required pivotal interconnection of the resulting front and rear sections 43 and 44 respectively of those rails.

It will also be noted that the truck 14 is provided with conventional leaf springs 48 which are hung at their front and rear ends 49 and 50 respectively from spring hanger brackets 51 and 52 respectively, the rear axle 32 being secured in a conventional manner to the springs 48.

The deck 20 is shown in the accompanying drawings as comprising longitudinally extending and transversely spaced apart rails or sills 54, 55, 56 and 57 which are interconnected by transversely extending cross members 60. The deck 20 is fixedly secured to the rear section 44 of the side rails 38 and 40 in any appropriate manner, for example, by welding and/or by the use of bolts 62 as shown in FIG. 7. The deck 20 is completed by a cover plate 64 (not shown in FIG. 4) which is shown in the drawings as being formed as a flat sheet of metal riveted to the sills 54 to 57 and cross members 60 as shown at 66.

Figure 11:
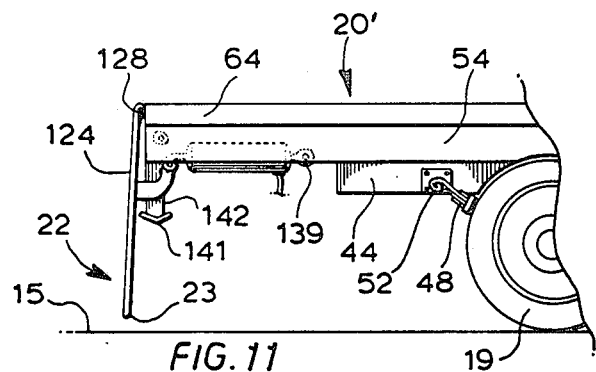
FIG. 11 is a fragmentary side elevational view of a truck similar to that shown in FIGS. 1 and 2 and showing details of the apron drive means with the apron shown in a lowered or retracted position thereof.
Figure 12:
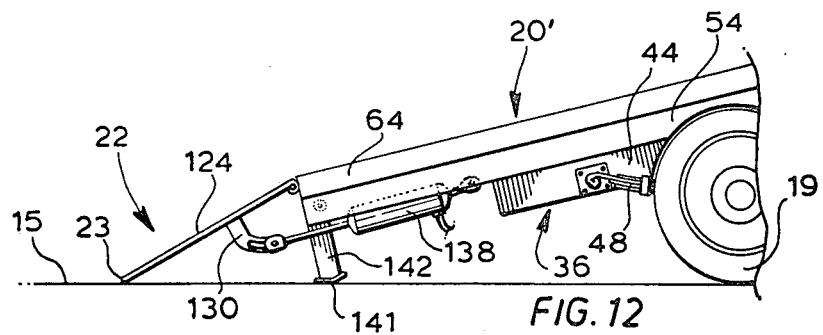
FIG. 12 is a fragmentary elevational view similar to that of FIG. 11 but showing the deck in its inclined second position and the apron in its extended or ramp position.

It will be noted that the deck 20 is shown in FIGS. 1 and 2 as terminating rearwardly at the rear edge of the frame 36 while, in FIG. 11 and 12, the deck 20' is shown as extending rearwardly beyond the rear end of frame 36. Apart from this one difference, the truck shown in FIGS. 11 and 12 is identical to the truck 14; consequently, all other legends are identical.

Before proceeding herein with a more detailed description of the construction of the truck 14, the factors affecting the position of pivotal axis about which the deck 20 moves will first be considered. It will readily be understood that, when the chassis or frame 36 is divided or cut into the front and rear sections 43 and 44 respectively and the tipping deck 20 is secured to the rear section 44 as already described, movement of that deck 20 out of its lowered position as shown in FIG. 1 and into its inclined position as shown in FIG. 2 will result in forward movement of the rear axle 32. In the case of a truck, such forward movement and consequently the extent to which the deck 20 can be tilted will inevitably be determined by the limit of longitudinal movement of the rearward part of the drive shaft 30 which can be accommodated by the existing slip joint 34.

In order to confirm a hypothesis, models of the truck 14 were constructed in which the position (relative to the rear axle 32) of the pivot axis about which the deck 20 rotates during its tilting and the resulting forward movement of the rear axle 32 were measured for each such position. The results obtained are illustrated graphically in FIG. 3 which shows three curves indicated at A, B and C. The curve A indicates the extent of the forward movement of the rear axle 32 when the deck was tilted through an angle of 15° and when the pivot axis was disposed at varying distances forwardly from the front ends of the rear springs and in generally the same horizontal plane as the chassis 36 when the deck 20 was in its lowered position. It is to be noted that the resulting forward movement of the rear axle 32 is least when the pivot axis is disposed as far rearwardly as possible.

Curves B and C illustrate the effect of lowering the pivot axis one and two length units respectively below the normal plane of the chassis 36, the curve C still, however, representing a pivot axis disposed slightly above the rear axle 32. Curves B and C clearly show that the extent of the forward movement of the rear axle 32 is considerably reduced as the pivot axis is lowered. This confirms the hypothesis that, to minimize the forward movement of the rear axle, the pivot axis should be as near as possible to the axis of that axle, and preferably below the normal plane of the chassis 36.

For this reason and as already indicated, it is an especially preferred feature of this invention to provide such a pivot axis at a position which is below the rear section of the vehicle chassis or frame that rear section is in its lowered first position. This is one preferred but not essential procedure whereby the present invention permits the modification of an existing conventional production model truck incorporating a slip joint 34 with limited capacity to accommodate forward movement of its rear axle. Accordingly, the truck 14, is shown as having in a manner yet to be explained, its pivot axis disposed, below the rear section 44 of the chassis side rails 38 and 40 as well as having that pivot axis disposed as far rearwardly as possible, i.e. essentially at the same longitudinal position as the front ends 49 of the rear springs 48.

To obtain such lowered pivot axis position, the aforementioned pivotal interconnection 46 of the front and rear sections 43 and 44 respectively of the side rails 38 and 40 is obtained by the use of transversely spaced apart hinges generally indicated at 70 and each of which comprises a rear mounting plate 72 secured, for example, by rivets 73 to the rear section 44 of a respective one of the side rails 38 and 40, and a front mounting plate 74 secured, for example by rivets 75, to the front section 43 of the same one of the side rails 38 and 40.

The mounting plates 72 and 74 of each hinge 70 are formed below the lower edges of the rail sections 43 and 44 with aligned hinge sleeves 78 receiving a hinge pin 79, the axis of which then constitutes the pivotal axis of the deck 20. It will be understood that the extent of forward movement of the rear axle 32 is minimized by such lowering of that pivot axis below the chassis 36. Additionally, the front hanger brackets 51 for the rear springs 48 are remounted on the rear mounting plates 72 so further to reduce the forward movement of the rear axle 32.

Referring further to the specific construction shown in the accompanying drawings for the hinges 70, it will be noted that the front mounting plate 74 of each such hinge is integrally formed with an arcuate tongue 80 which is movably recieved in a correspondingly arcuate space or tube 81 defined by the inner surface of an upward extension 82 of the mounting plate 72 and the opposed vertical surface 84, of a respective one of the sills 55 and 56.

The purpose of this structure will be more readily understood as the description herein proceeds but it can be noted, at this juncture, that, should the hinge pin 79 of one or both of the hinges 70 fail, the mutual engagement of the tongues 80 with the surrounding walls of the tubes 81 in which they are disposed will be effective to prevent any substantial relative movement in the vertical direction between the front and rear sections 43 and 44 respectively of the side rails 38 and 40, so providing a substantial improvement in operating safety.

Reference will now be made to the means provided for moving the deck 20 between its lowered and inclined positions. For this purpose, two hydraulically operated tilting mechanisms each generally indicated at 86 (omitted from FIG. 9) are provided, one at each side of the chassis 36. Each such mechanism 86 comprises a double-acting hydraulic cylinder 88 which is pivotally secured at 89 to a respective one of the sills 55 and 56 near the forward end of the deck 20 as will best be understood by reference to FIG. 8. Piston rods 90 extend from such cylinders 88 and are terminally and pivotally secured as indicated at 92 to plates 94 secured, for example, by rivets 96 to the front sections 43 of respective ones of the side rails 38 and 40.

Figure 8:
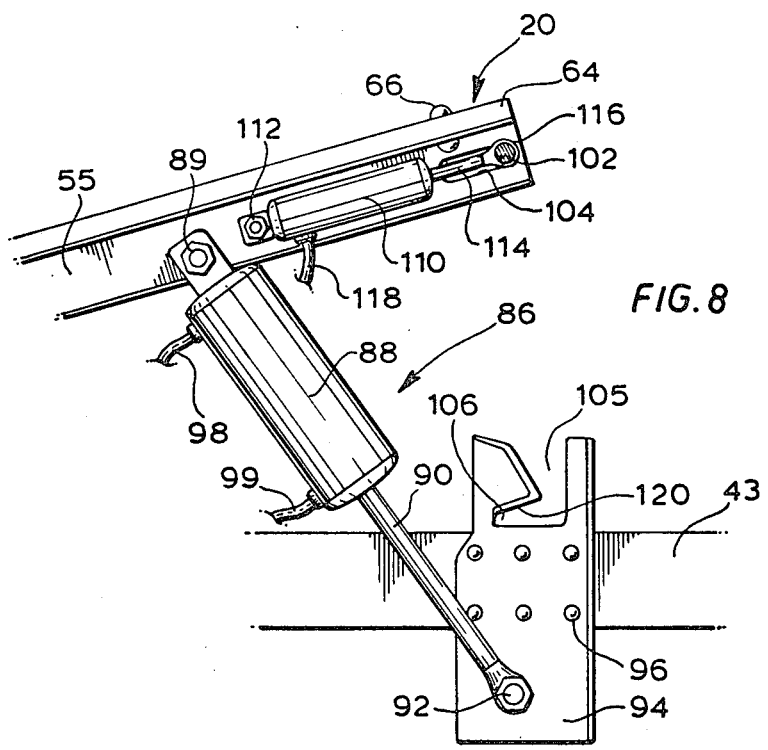
FIG. 8 is a fragmentary elevational view showing one of two hydraulic cylinders provided on the truck shown in FIGS. 1 and 2 for moving the deck of that truck between its two positions, as well as part of a latching mechanism provided for releasably retaining the deck in its lowered first position.

It will now be understood that the introduction of hydraulic fluid under pressure into the upper ends of the cylinders 88, i.e. through hoses 98, will be effective to elevate the front end of the deck 20 and so will move that deck out of its lowered first position as shown in FIG. 1 and into its inclined second position as shown in FIGS. 2 and 8. The introduction of hydraulic fluid under pressure into the cylinders 88 at their lower ends, i.e. through hoses 99, will similarly be effective to lower the deck 20.

The truck 14 shown in the accompanying drawings also comprises a latching mechanism for holding or retaining the deck 20 in its lowered first position.

Such latching mechanism comprises a transversely extending latching bar 102 which is supported in and extends through longitudinally extending slots 104 formed in the sills 55 and 56 of the deck 20 generally at the front end of that deck. The bar 102 extends transversely outwardly beyond the sills 55 and 56 so that, when the deck 20 is lowered, the ends of the bar 102 will enter upwardly open slots 105 formed in upward extensions of the aforementioned plates 94. The slots 105 open at their lower ends into rearwardly extending detent slots 106. A helical tension spring 108 extends between the bar 102 and the rearwardly adjacent crossmember 60 so to urge the latching bar 102 in the rearward direction and to hold the ends of that bar 102 in the detent slots 106 after the deck 20 has been moved into its lowered first position so then to prevent accidental upward or tilting movement of that deck 20.

To release the bar 102 from the detent slots 106 when it is desired to move the deck into its inclined second position, single acting hydraulic cylinders 110 are provided. These cylinders 110 are pivotally anchored at their rear ends as indicated at 112 to respective ones of the sills 55 and 56 while piston rods 114 extending from such cylinders 110 are coupled by collars 116 to the latching bar 102. Hoses 118 are provided for the supply of hydraulic fluid under pressure to the cylinders 110 to cause forward movement of the latching bar 102 and its release from the detent slots 106 against the action of the spring 108 thereby permitting upward lifting movement of the deck 20 by the tilting mechanism 86. It will be noted from FIG. 8 that the edge surface 120 formed in each of the plates 94 and upwardly defining the detent slots 106 in those plates is formed so that it slopes downwardly and rearwardly so to provide a cam action and ensuring that the deck 20 will be held firmly in its lowered position even after wear of the ends of the latching bar 102 has occurred.

It will also be noted that, when the ends of the latching bar 102 are disposed in the detent slots 106, rearward movement of the deck 20 in the event of structural failure of one or both of the aforementioned hinge pins 79 cannot occur to any significant extent, i.e. it cannot exceed the relatively short stroke of the piston rods 114. Together with the hinge structure comprising the tongues 80 and tubes 81, as already described herein for preventing relative vertical movement of the deck 20 and the front section of the chassis 36, such vertical locking of the front end of the deck 20 allows the truck 14 still to be driven safely even after hinge pin failure and until such times as those hinge pins can be replaced.

Figure 10:
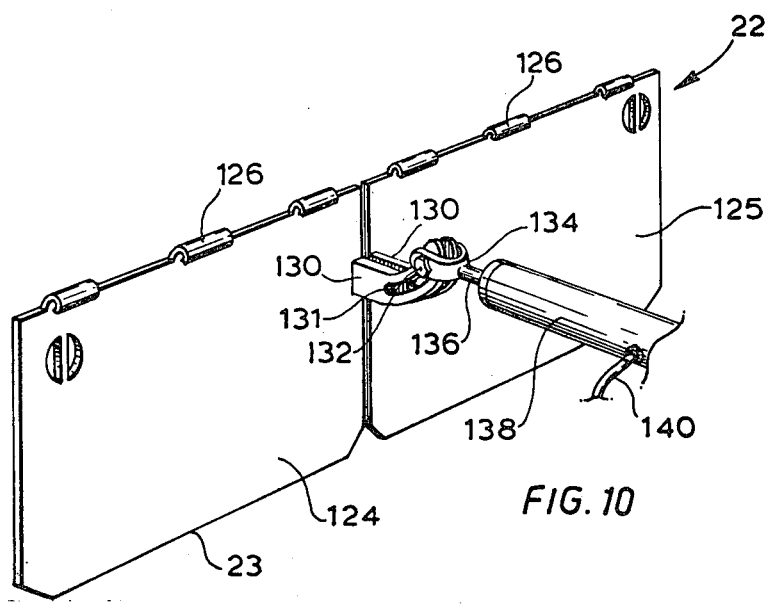
FIG. 10 is a perspective view of a pivotally mounted apron as provided on the truck shown in FIGS. 1 and 2, and part of the hydraulic drive means provided for moving that apron.

Reference will next be made to FIGS. 10, 11 and 12 which show details of the construction and mounting of the apron 22 already referred to herein. As will best be seen from FIG. 10, the apron 22 comprises two generally planar plates 124 and 125 which are formed along their top edges with hinge sleeves 126 which receive an apron hinge pin 128 which is suitably mounted across the rear end of the deck 20. The apron plates are thus mounted for pivotal movement between the positions shown in FIGS. 11 and 12. Arms 130 are secured to and extend forwardly from the apron plates 124 and 125. These arms 130 are formed with arcuate slots 131 through which a pin 132 extends to couple the apron 22 to a shackle 134 provided on the rear end of a piston rod 136 of a single acting hydraulic cylinder 138 which is itself pivotally mounted at 139 at its front end on one or the cross members 60 of the deck 20. A hose 140 is provided for the supply of hydraulic fluid under pressure to the front end of the cylinder 138 to cause movement of the apron 22 from its lowered position as shown in FIG. 11 and into its extended or ramp position as shown in FIG. 12.

By constructing the apron 22 of the two separate plates 124 and 125 and by providing the slots 131 in the arms 130, the apron 22 can be used even when the ground surface which it engages is not completely flat.

To provide additional support for the deck 20 when a load is being placed thereon or removed therefrom, a transversely extending and fixed ground-engaging shoe 141 is secured to the deck 20 by depending arms 142 generally at the rear end of the deck 20 as will readily be understood by reference to FIGS. 11 and 12.

Figure 13:
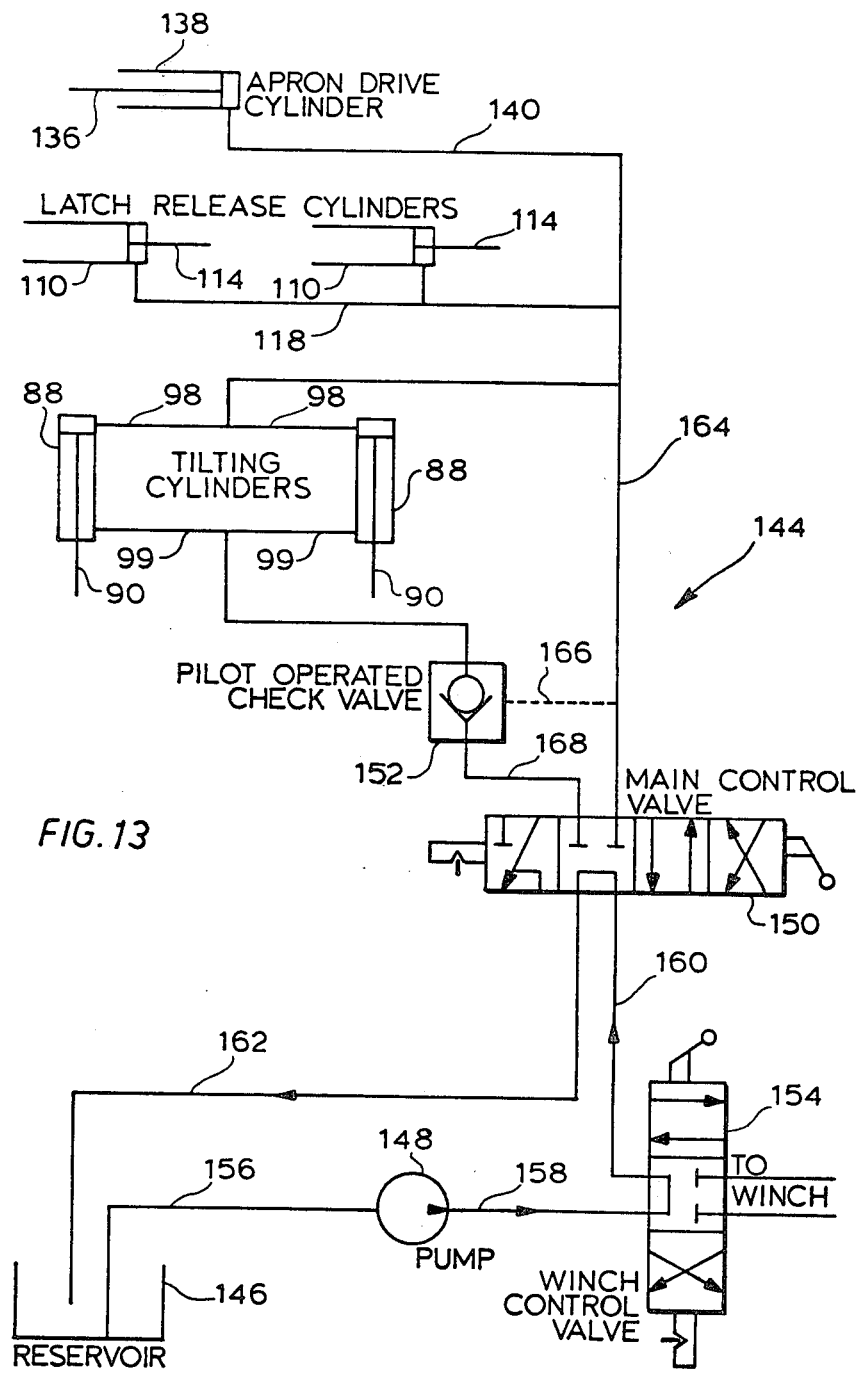
FIG. 13 is a schematic diagram illustrating a hydraulic control system provided on the trucks shown in the preceding figures.

Reference will now be made to FIG. 13 which shows generally at 144 one typical hydraulic control system for use on the truck 14. The system 144 includes the double-acting tilting cylinders 88, the single-acting latch release cylinders 110 and the apron drive cylinder 138. The system also comprises a fluid reservoir 146, a hydraulic pump 148, a main control valve 150 and a pilot operated check valve 152. If the winch 24 is also hydraulically operated, the system 144 will then also include a winch control valve as indicated at 154 in FIG. 13.

The pump 148 can be driven from the engine of the truck 14 or independently thereof. In operation of the hydraulic control system 144, fluid is pumped through line 156 from the reservoir 146 by the pump 148 to a pressure feed line 158 which supplies fluid under pressure to the winch control valve 154 and then through line 160 to the main control valve 150. A return line 162 extends between the main control valve 150 and the reservoir 146.

Since the winch control valve 154 is of conventional construction and since the manner in which it operates to permit the flow of hydraulic fluid through the winch motor in either direction will be readily apparent from FIG. 13, the construction and operation of that valve 154 will not be described in greater detail herein.

Referring now to the main control valve 150, it will be seen that it is a four-position manually controlled valve with a detent mechanism for normally retaining it in the stop position actually illustrated in FIG. 13. Assuming that the truck 14 is in the position shown in FIG. 1 with the deck 20 in its forward position and that the main control valve is then moved one step to the left from the position shown in FIG. 13, hydraulic fluid will then flow under pressure from line 160 and through the line 164 to the hoses 98 of the tilting cylinders 88 and through the hoses 140 and 118 to the apron drive cylinder 138 and the latch release cylinders 110 respectively so to move the apron 22 into its extended position (FIG. 12) and to release the latching bar 102 from the detent slots 106. As soon as the pressure in the line 164 reaches a predetermined value, the check valve 152 connected thereto by the control line 166 automatically opens to allow the return of hydraulic fluid from the lower ends of the tilting cylinders 88 through a return line 168 to the main control valve 150 and into the return line 162. It will be noted that the check valve 152 is effective to maintain pressure in the lower ends of the tilting cylinders 88 until positive hydraulic pressure is applied to the apron drive cylinder 138 and the latch release cylinders 110. This effectively provides a hydraulic hold-down or locking function so preventing accidental tilting of the deck 20 in the event of structural failure of the mechanical latching mechanism. As soon as the deck 20 has been elevated to the desired extent, the valve 150 is released and is spring returned to the position actually shown in FIG. 13, at which time all the hydraulic cylinders are effectively closed.

When it is desired to lower the deck 20 into its first position as shown in FIG. 1, the main control valve 150 is moved into its most left-handed position so that fluid under pressure then flows from the line 160 through the main control valve and through the line 168 and the check valve 152 to the lower ends of the tilting cylinders 88. Return flow of hydraulic fluid from the upper ends of the tilting cylinders 88 then occurs through the line 164 so allowing lowering of the deck 20 to occur. During such lowering, some fluid return flow from the apron drive cylinder 138 and from the latch release cylinders 110 will also occur so that, as the deck 20 reaches its fully lowered position, the latching bar 102 will be pulled by the spring 108 into the detent slots 106.

When the deck 20 reaches its fully lowered position, the handle of the main control valve 150 is released and that valve automatically returns to the position shown in FIG. 13, so providing the hydraulic locking function already described.

If, when the deck 20 has reached its fully lowered position, the apron 22 has not been completely lowered into its retracted position as shown in FIG. 11 and if hydraulic fluid still remains in the latch release cylinders 110, the main control valve 150 is moved temporarily to the right from its neutral position so to allow further return of fluid from the apron drive as a result of the weight of the apron 22 acting on the piston rod 136 of the apron drive cylinder 138 and to allow further return of fluid from the latch release cylinders under the action of the spring 108. The main control value 150 is then released and again returns to the position shown in FIG. 13.

Although the invention has been hereinbefore specifically described with reference to the particular embodiments thereof as illustrated in the accompanying drawings, it should be understood that numerous variations and modifications in the described structure and the operation thereof are possible without departing from the scope of the invention. In particular, it should be understood that the various novel features hereinbefore described can be applied separately or in various combinations to the construction of a tilting deck truck or trailer.

The embodiments of the invention in which an exclusive property or privilege is claimed are defined as follows:

1. A vehicle which comprises:
  a front frame section;
  a motive power source on said front frame section;
  a rear frame section coplanar with the front frame section when the former is in a generally horizontal lowered first position;
  a transversely extending rear axle carrying ground engaging rear wheels and supporting the said rear frame section;
  a drive transmission shaft extending longitudinally between said motive power source and said rear axle and operatively coupled to said rear axle so as to transmit rotational drive movement thereto from said motive power source;
  slip means in said drive transmission and adapted to accommodate limited shortening of said drive transmission shaft on forward movement of said rear axle toward said motive power source;
  pivot means pivotally interconnecting the abutting ends of said front and rear frame sections for movement of said rear frame section between the generally horizontal lowered first position and a rearwardly and downwardly inclined second position about a pivot axis positioned sufficiently close to said rear axle that, on movement of said rear frame section out of said generally horizontal lowered first position thereof and into said inclined second position thereof, the resulting forward movement of said rear axle relative to said motive power source does not exceed said limited shortening of said drive transmission shaft which said slip means is adapted to accommodate, said pivot axis being positioned forwardly of said rear axle, and further being positioned below said rear frame section when that section is in said lowered first position thereof;

a deck fixed on said rear frame section for conjoint pivotal movement therewith and extending generally forwardly over said front frame section when said rear frame section is disposed in said generally horizontal lowered first position thereof; and tilting drive means for moving said deck and said rear frame section between said lowered first position and said inclined second position thereof.

2. The vehicle as set forth in claim 1 comprising:
releasable latching means for releasably retaining said deck and said rear frame section in said lowered first position thereof.

3. The vehicle as set forth in claim 2 comprising:
a rearward extension on said deck having a generally transversely extending rear edge for abutment with an upwardly facing ground surface on which said vehicle is disposed when said deck and said rear frame section are moved into said inclined second position thereof so to provide a ramp then essentially coplanar with said deck.

4. The vehicle as set forth in claim 3 wherein:
said rearward extension comprises an apron movably mounted at a rear end of said deck for movement between a retracted position and an extended ramp position.

5. The vehicle as set forth in claim 4 wherein said apron is pivotally mounted at said rear end of said deck for movement between said extended ramp position thereof and said retracted position thereof in which said apron depends generally downwardly from said deck;
and comprises apron drive means for moving said apron between said retracted and extended positions.

6. The vehicle as set forth in claim 1 comprising:
first and second transversely spaced apart spring means interconnecting said rear frame section and rear axle rearwardly of said pivot means.

7. The vehicle as set forth in claim 1, wherein the pivot means comprises:
a pair of transversely spaced apart first and second hinge members, each pair interconnecting the front and rear frame sections and incorporating a transversely extending hinge pin, each of said first hinge members comprising an arcuate tongue member, and each of said second hinge members comprising an arcuate tube member receiving the tongue member during pivotal movement of the rear frame section, whereby the mutual engagement of the tongue and tube members is effective to restrict relative vertical movement of the front and rear frame sections in the event of structural failure of the hinge pin.

* * * * *